Jan. 27, 1931. J. R. WEAVER 1,790,183
INSPECTING APPARATUS FOR METER PAPER
Original Filed Dec. 6, 1927 2 Sheets-Sheet 1

INVENTOR
James R. Weaver
BY
ATTORNEY

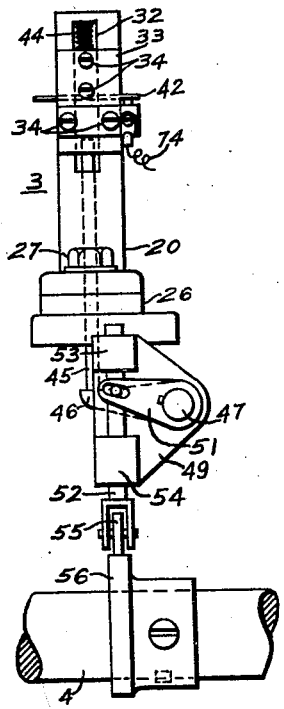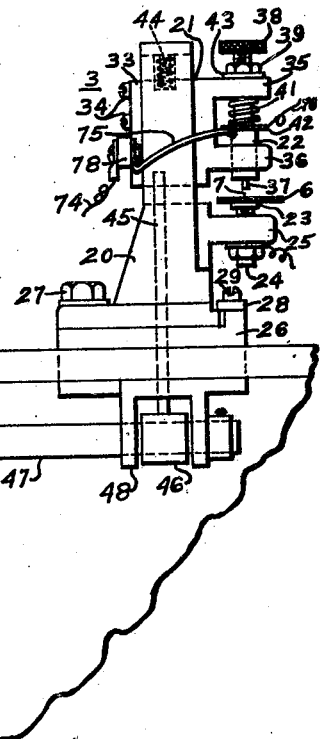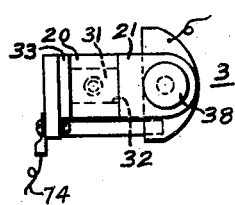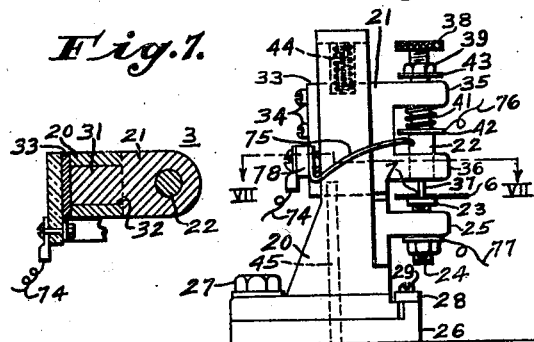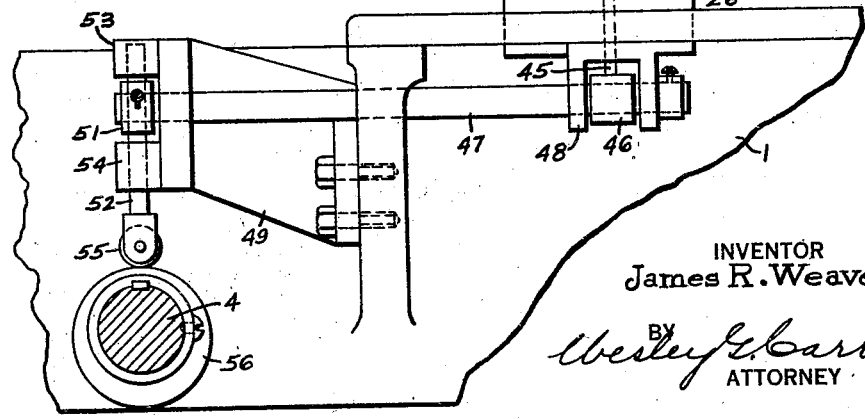

Patented Jan. 27, 1931

1,790,183

UNITED STATES PATENT OFFICE

JAMES R. WEAVER, OF IRWIN, PENNSYLVANIA, ASSIGNOR TO WESTINGHOUSE ELECTRIC & MANUFACTURING COMPANY, A CORPORATION OF PENNSYLVANIA

INSPECTING APPARATUS FOR METER PAPER

Original application filed December 6, 1927, Serial No. 238,106. Divided and this application filed May 10, 1929. Serial No. 362,099.

My invention relates generally to testing machines and more particularly to machines for testing the accuracy of the spacing of holes in perforated material.

While the invention is applicable to a wide variety of uses, it is particularly useful for inspecting paper for use in electric meters. Such paper must be of uniform width and must be provided with marginal holes for engaging the driving sprockets in the meters. The marginal holes must be accurately spaced, both laterally and longitudinally, in order that the sheet may be drawn through a meter at the proper speed to ensure proper functioning of the meter.

Meters which utilize recording sheets are often operated in positions where it is not feasible to keep them under observation, and, in fact, they may be operated many days at a time without being inspected. It will, therefore, be understood that defects in the recording paper will cause a failure of the record, and, therefore, a loss to the power distributor.

The object of the invention, generally stated, is the provision of testing devices, that shall be simple and efficient in operation and capable of being readily and economically manufactured.

A more specific object of the invention is to provide for testing the lateral and longitudinal spacing of holes punched in paper or other material.

Another object of the invention is to provide for automatically stopping the operation of a testing machine when the holes under inspection are not accurately located in the punched material.

Other objects of the invention will, in part, be obvious and will, in part, appear hereinafter.

The invention, accordingly, is disclosed in the embodiment thereof shown in the accompanying drawings, and comprises the structural features and the combination of elements and arrangement of parts which will be hereinafter set forth and the scope of the application of which will be particularly defined in the claims.

For a fuller understanding of the invention, reference may be had to the following detail description, taken in connection with the accompanying drawings, in which:

Fig. 3 is a view, in side elevation, of the machine shown diagrammatically in Fig. 1, with the plunger of the testing device in a raised position, Fig. 4 is a view, similar to Fig. 3, but showing the plunger of the testing device in its lowermost position, Fig. 5 is a view, in rear elevation, of the testing device shown in Fig. 1.

Fig. 6 is a top plan view of the testing device, and

Fig. 7 is a view, in section, taken on the line VII—VII of Fig. 4.

Figure 2:
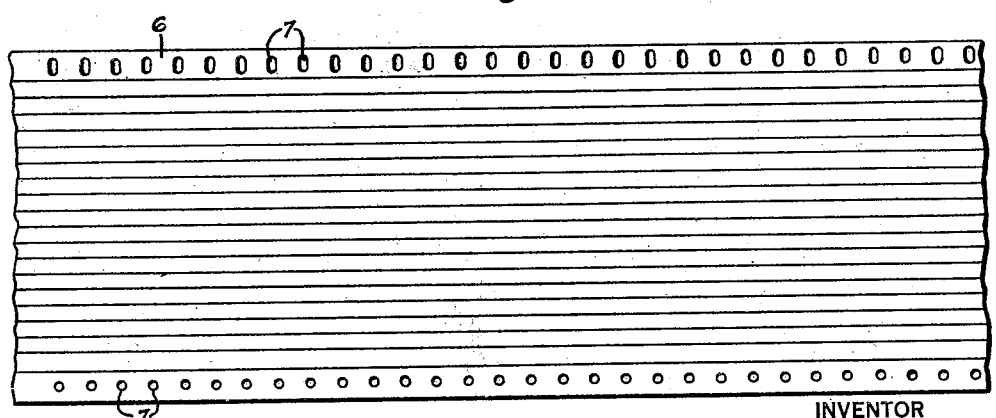
Fig. 2 is a top plan view of a section of such perforated paper as may be tested by the machine illustrated in Fig. 1.

Referring now to the drawings, the particular embodiment of the invention which is there illustrated comprises, in general, a frame 1, upon which is supported a drum 2 for carrying the material to be tested and a testing device 3. For operating the testing device 3, a drive shaft 4 is suitably journalled in the frame 1 and operatively connected to a driving motor 5. The drum 2, which is disposed at one end of the machine, carries a roll of meter paper 6 that is perforated along its edges by symmetrically spaced holes 7, as best shown in Fig. 2. From the drum 2, the paper 6 is led through tensioning rolls 8 and thence to the testing device 3.

In order that the paper 6 may be drawn through the machine, a pair of friction rolls 9 and 10, which engage it in the usual well known manner, are provided beyond the testing device 3. In testing the perforated paper 6, it is necessary that it be advanced periodically a distance equal to a multiple of the distance between two symmetrically spaced holes 7. This measured periodic advance of the paper 6 is accomplished by means of a ratchet device that comprises a ratchet wheel 11 which is mounted on the lower friction roll 9.

As shown, the ratchet wheel 11 is disposed to be operated intermittently by a pawl 12 which is carried by a lever 13. The lever 13 is pivoted at a point on the axis of the roll 9 and is oscillated about its pivot point by means of a connecting rod 14, which is, in turn, actuated by a crank pin carried by a disc 15 with which one end of the shaft 4 is provided.

To provide for adjusting the distance which the paper 6 is advanced at each rotation of the shaft 4, the connecting rod 14 is pivotally connected to the lever 13 by means of a block 16 that is slidably mounted in a slot 17 in the lever.

By moving the block 16 along the slot 17, the effective length of the lever 13 may be adjusted and, consequently, the extent of its oscillation movement changed to turn the roll 9 the proper amount to move the paper 6 the required distance. After passing through the rolls 9 and 10, the paper 6 is wound upon a receiving drum 18 that is disposed at the end of the testing machine.

The testing device 3 comprises a supporting body 20, a movable block 21 that is mounted in the upper portion of the supporting body, a cylindrical plunger 22 that is carried by the movable block 21, and an anvil 23 that is disposed on a set screw 24 which is mounted in a bracket 25 on the supporting body 20.

The supporting body 20 is mounted on a base 26 which is disposed on the frame 1. In order that the body 20 may be adjusted on the base 26 to suit the conditions under which the testing device operates, it is secured thereto by a bolt 27 and a clamping clip 28 that is held in place by a screw 29.

The movable block 21 is provided with a narrow section 31 which is adapted to be slidably mounted in a rectangular slot 32 in the upper portion of the supporting body 20 in such manner that the block may be moved vertically. A plate 33 is attached to the end of the narrow section 31 by screws 34 to keep the block in position in the slot.

The plunger 22 is slidably disposed in a pair of extended portions 35 and 36 of the movable block 21 and is provided with a contact point 37 for engaging the anvil 23. In order that the contact point 37 may be removed for repairs or replacement, it is mounted in the hollow center of the plunger 22 by means of a screw 38 and a lock nut 39. It will, therefore, be understood that contact points 37 of different sizes may be employed to suit the size of the holes 7 in the paper 6, and that the position of the end of the contact point 37 may be adjusted relative to the anvil 23.

For the purpose of forcing the plunger 22 and its contact point 37 toward the anvil 23, a spring 41 is coiled around the upper central portion of the plunger 22, with one end resting against the upper extended portion 35 of the block 21 and the opposite end resting against the upper side of a transverse plate 42 that is mounted on the central portion of the plunger 22.

A collar 43 on the upper part of the plunger limits its movement relative to the block 21. The means for moving the block 21 relative to the supporting body 20 comprises a coiled spring 44 for forcing the block downwardly and a push rod 45 for moving it upwardly against the action of the spring 44.

As shown, the spring 44 is disposed in the upper end of the slot 32 in the supporting body 20, with its upper end in engagement with a wall above the slot and its lower end bearing on the movable block 21 so that it exerts a downward pressure on the block at all times.

The push rod 45 is disposed in a vertical position in the lower part of the supporting body 20, with its upper end engaging the block 21 and its lower end bearing on the free end of an actuating arm 46. The actuating arm 46 is secured to, and may be operated by, a transverse shaft 47 that is supported by brackets 48 and 49 that are mounted on the frame 1. The transverse shaft 47 may be rotated by a second arm 51 that is mounted thereon near one end. The outer end of the second arm 51 is connected, by means of a pin and slot joint, to a vertical rod 52 that is mounted in a pair of bearings 53 and 54 in the bracket 49.

In order to actuate the vertical rod 52 to rotate the transverse shaft 47 through the second arm 51, its lower end is provided with a roller 55 that engages an eccentric collar or cam 56 that is disposed on the drive shaft 4. It will, therefore, be seen that rotation of the drive shaft 4 will, through the action of the eccentric 56, cause the block 21 to be moved upwardly in the supporting body 20 and that the spring 44 will cause it to be moved downwardly, thereby effecting a reciprocating movement of the block 21.

Inasmuch as the plunger 22 is slidably mounted in the movable block 21 and is forced towards its lowermost position therein, a downward movement of the movable block 21 will carry the plunger 22 down with it until its contact point 37 strikes the anvil 23. The plunger 22, upon striking the anvil 23, will be held stationary while the block 21 completes its downward movement.

Figure 1:
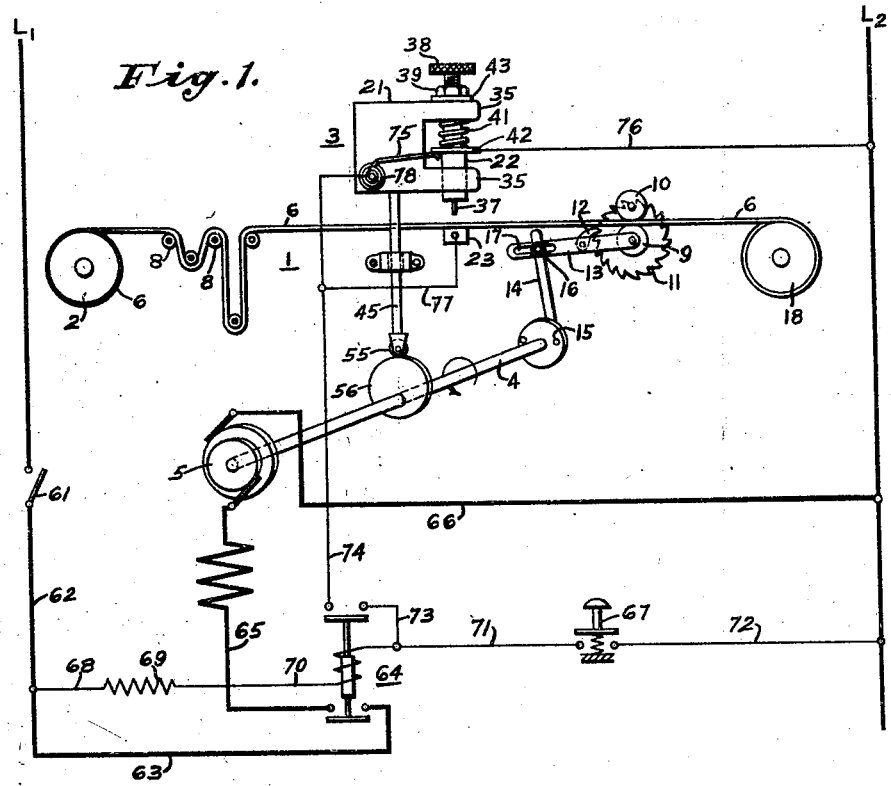
Figure 1 is a diagrammatic view, in side elevation, of a machine for inspecting meter paper that is provided with a testing device embodying my invention, together with a diagram of the electrical control system therefor.

As shown in Fig. 1, the testing device 3 is electrically connected in the motor circuit in such manner as to constitute a switch for controlling the motor 5. The motor 5 may be operated from any suitable source of power and, in this instance, a power line, comprising line conductors L1 and L2, is shown and the motor circuit extends from the supply line L1, through a line switch 61, conductors 62 and 63, the contact members of a relay 64, conductor 65, motor 5 and a conductor 66, to supply line L2.

The testing device 3 is disposed to control the line relay 64. As shown, the testing device presents a plurality of circuit paths which may be closed alternately to control the actuating circuit of the relay 64 to govern the operation of the motor.

In order to start the motor, a push-button switch 67 is provided for closing the actuating circuit for the relay 64. Therefore, when the push-button switch is pressed, a circuit is established which extends from the conductor 62, through a conductor 68, a resistor 69, a conductor 70, the actuating coil of the relay 64, a conductor 71, the push-button switch 67 and a conductor 72, to the line conductor L2, and the relay is closed. When the relay is closed, a holding circuit is established which may be traced from the energized actuating coil of the relay 64, through a conductor 73, an interlock on the relay 64, a conductor 74 and one of the current paths through the testing device. In the present illustration, the current path through the testing device comprises a spring 75 and the plate 42 to a conductor 76. When the block 21 is actuated to its lowermost position, the current path through the testing machine extends from the conductor 74, a conductor 77, anvil 23, contact point 37, plunger 22 and contact plate 42, to the conductor 76.

The spring 75 is mounted on an insulating body 78 on the movable block 21 and is disposed in such manner that its free end will engage the underside of the plate 42 on the plunger 22, while the movable block 21 is in its upper position (as shown in Fig. 3), but will be out of engagement with the plate 42 when the block 21 reaches its lowermost position (as shown in Fig. 4). During the downward movement of the block 21, the spring 75 will remain in engagement with the plate 42 until after the plunger 22 strikes the anvil 23.

It will, therefore, be understood that the circuits through the spring 75 will be closed and that the circuit through the anvil 23 will be open when the block 21 and the plunger 22 are in their uppermost positions.

When the block 21 is moved to its central position, and the contact point 37 engages the anvil 23, both of the current paths through the testing device will be closed and will be in parallel. When the block 21 is moved to its lowermost position, the circuit through the spring 75 is opened, and the circuit through the anvil 23 is closed, provided that the holes 7 in the paper are accurately spaced to register with the contact point 37.

In order to test a roll of meter paper 6, the paper is placed on the drum 2 and passed through the testing device 3 and the rolls 9 and 10 to the drum 18. It will be necessary to adjust the paper relative to the rolls 9 and 10 in such manner that the contact member 37 will pass through one of the holes 7 when moved to its lowermost position by the cam 56. The effective length of the lever arm 13 is also adjusted to move the paper forward a distance equal to a multiple of the distance between two holes 7, as explained hereinbefore.

The motor 5 may be then started by first closing the line switch 61 and then pressing the starting push-button switch 67. The relay 64 will close the motor circuit and will be held in the closed position by the holding circuit.

The operation of the testing machine may now be followed through one cycle, starting with the parts in the position shown in Figs. 1 and 3 and assuming that the drive shaft 4 turns counter-clockwise. During the first quarter of a revolution, the crank pin of the disc 15 will be moved to its highest position, thus drawing the paper 6 through the testing device 3 by means of the ratchet mechanism on the roll 9. Simultaneously, the cam 56 will permit the contact point 37 to move towards the paper 6. In the next quarter of a revolution, the crank pin will move downwardly and cause the pawl 12 to slip over the teeth on the ratchet wheel 11 without changing the position of the paper. The cam 56 will, during this period, permit the movable block 21 to move to its lowermost position, and, assuming that the paper 6 has been properly positioned in the machine, the contact member 37 will pass through a hole 7 and engage the anvil 23, as shown in Fig. 4.

During the third quarter, the pawl 12 will continue to slip over the teeth on the ratchet wheel 11, and the contact member 37 will be withdrawn from the hole 7 by the further rotation of the cam 56. When the crank pin of disc 15 reaches the bottom of its travel, the pawl 12 will again engage the teeth of the ratchet wheel 11 and, as the operation continues, the paper 6 will be drawn through the testing device 3 a sufficient distance to position another hole 7 in alignment with the contact member 37.

If the hole is accurately placed, the contact point 37 will engage the anvil 23 through the hole 7 and maintain a circuit through the testing device which holds the relay switch 64 closed. The holding circuit, established when the plunger is in its lowermost position, extends from conductor 62, through conductor 68, resistor 69, conductor 70, the coil of relay 64, conductors 73, 74 and 77, the anvil 23, contact member 37 and the plunger 22, the plate 42 and conductor 76, to the line conductor L2.

When the inspecting device is properly adjusted with reference to the paper being tested, it will continue to operate, and the plunger contact point 37 will engage the anvil 23 through the holes 7 in the paper at each downward stroke, so long as the holes in the paper being passed through the machine are accurately spaced. However, if the holes 7 in the paper 6 are inaccurately spaced, a hole 7 will not register with the plunger contact point 37 and will be prevented from engaging the anvil 23 on its downward movement by reason of the fact that it strikes the paper instead of entering one of the holes. Under such conditions, the circuit through the inspecting device will be broken as soon as the spring 75 becomes disengaged from the plate 42, thereby deenergizing the relay and stopping the motor 5.

When the machine is stopped by the passage of inaccurately punched paper through the inspecting device, the operator either cuts out the defective portion of paper or marks it off so that it may be eliminated when the paper is being rewound.

While the illustrated example constitutes a particular embodiment of my invention, it will be obvious to those skilled in the art that it is not limited strictly to the details shown, since, manifestly, the same may be varied considerably without departing from the spirit and scope of the invention, as defined in the appended claims.

I claim as my invention:

1. A device for inspecting the location of holes in a fabric comprising a switch provided with two circuits through itself, one of said circuits being disposed to be completed through one of the holes in the fabric and means for closing both of said circuits in alternate overlapping order.

2. A device for inspecting the placing of holes in a fabric having insulating characteristics comprising a switch provided with two circuits through itself, and means for closing both of said circuits in alternate overlapping order, one of said circuits being disposed to be closed through an accurately placed hole in the fabric, whereby it will be prevented from closing when the holes are not accurately placed in the fabric.

3. A device for inspecting the location of holes in a fabric comprising a switch having a supporting body, a carrying member movably mounted in the supporting body, a plunger contact member movably mounted in the carrying member, a stationary contact member disposed to be engaged by the plunger contact member, and a contact member mounted on the carrying member and disposed to be in engagement with the plunger contact member when the carrying member is in one position and out of engagement therewith when the carrying member is in another position.

4. A device for inspecting the location of holes in a fabric comprising a switch having a supporting body, a carrying member movably mounted in the supporting body, a plunger contact member movably mounted in the carrying member, a stationary contact member disposed to be engaged by the plunger contact member, means for biasing the plunger contact member toward the stationary contact member, and a contact member mounted on the carrying member and disposed to engage with the plunger contact member when the carrying member is in one position and to be disengaged from said contact member when the carrying member is in another position.

5. A device for inspecting the location of holes in a fabric comprising a switch having a supporting body, a carrying member movably mounted in a supporting body, a plunger contact member movably mounted in the carrying member, a stationary contact member disposed to be engaged by the plunger contact member, means for biasing the plunger contact member toward the stationary contact member, and a resilient contact member mounted upon and insulated from the carrying member, said resilient contact member being so disposed that its free end is in engagement with the plunger contact member when the carrying member is in one position and out of engagement therewith when the carrying member is in another position.

6. A device for continuously testing the accuracy with which symmetrically disposed perforations are placed in sheet material that comprises an electrical contacting device that is disposed to close an electrical circuit through a perforation in the sheet material being tested, means for moving the sheet material periodically a distance equal to a multiple of the distance between two perforations and means for closing the contacting device while the material is stationary whereby an inaccuracy in the positioning of the perforations will be evidenced by failure to complete the electrical circuit.

7. In a device for testing perforated sheet material, in combination, means for moving the material to be tested in a periodic progressive manner a distance equal to a multiple of the distance between two perforations, a normally closed electrical testing circuit, contact members in the testing circuit, said contact members being disposed to be closed through a perforation in the sheet material while the material is stationary, a circuit breaker disposed in parallel-circuit relation to the contact members and means for opening the circuit breaker while the sheet material is stationary, whereby, if the contact members are prevented from closing by reason of inaccuracy in the position of a perforation, the testing circuit will be opened.

In testimony whereof, I have hereunto subscribed my name this 30th day of April, 1929.

JAMES R. WEAVER.